(12) United States Patent
Munawar

(10) Patent No.: US 11,163,269 B2
(45) Date of Patent: *Nov. 2, 2021

(54) ADAPTIVE CONTROL OF NEGATIVE LEARNING FOR LIMITED RECONSTRUCTION CAPABILITY AUTO ENCODER

(71) Applicant: INTERNATIONAL BUSINESS MACHINES CORPORATION, Armonk, NY (US)

(72) Inventor: Asim Munawar, Ichikawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1039 days.

This patent is subject to a terminal disclaimer.

(21) Appl. No.: 15/700,429

(22) Filed: Sep. 11, 2017

(65) Prior Publication Data

US 2019/0079468 A1   Mar. 14, 2019

(51) Int. Cl.
*G06N 3/08* (2006.01)
*G05B 13/02* (2006.01)
(Continued)

(52) U.S. Cl.
CPC ....... *G05B 13/0265* (2013.01); *G06K 9/6262* (2013.01); *G06N 3/0454* (2013.01);
(Continued)

(58) Field of Classification Search
CPC ...................................................... G06N 3/08
See application file for complete search history.

(56) References Cited

U.S. PATENT DOCUMENTS 6,267,722 B1    7/2001   Anderson et al.
6,556,951 B1 *  4/2003   Deleo .................... G16H 50/20
                                                              702/183
(Continued)

FOREIGN PATENT DOCUMENTS

WO    2012109407 A1    8/2012
WO    2014144103 A1    9/2014

OTHER PUBLICATIONS

Krizhevsky, Alex and Geoffrey E. Hinton. "Using Very Deep Autoencoders for Content-Based Image Retrieval" 2011 [ONLINE] Downloaded Feb. 17, 2021 https://www.cs.utoronto.ca/~hinton/absps/esann-deep-final.pdf (Year: 2011).*

(Continued)

*Primary Examiner* — Ben M Rifkin
(74) *Attorney, Agent, or Firm* — Tutunjian & Bitetto, P.C.; Randall Bluestone

(57) ABSTRACT

A computer-implemented method is provided for training a classification model. The method includes preparing, by a processor, positive and negative class data. The method further includes iteratively training the classification model, by the processor, using the positive class data and the negative class data such that the positive class data is reconstructed and the negative class data is prevented from being constructed, by the classification model. In response to a selection of a non-integer value as a number of negative learning iterations to be performed to train the classification model, a particular set of the negative class data that is reconstructed best by the classification model from among all of the negative class data is selected to be used for negative learning by the classification model. The training based on the positive class data is performed once before the negative learning iterations and once after each negative learning iteration.

9 Claims, 9 Drawing Sheets

(51) Int. Cl.
*G06N 5/02* (2006.01)
*G06N 20/00* (2019.01)
*G06N 3/04* (2006.01)
*G06K 9/62* (2006.01)
*G06F 17/18* (2006.01)

(52) U.S. Cl.
CPC ............... *G06N 3/08* (2013.01); *G06N 5/02* (2013.01); *G06N 20/00* (2019.01); *G06F 17/18* (2013.01)

(56) References Cited

U.S. PATENT DOCUMENTS

| | | | |
|---|---|---|---|
| 8,484,022 | B1 | 7/2013 | Vanhoucke |
| 8,548,951 | B2 | 10/2013 | Solmer et al. |
| 2003/0108244 | A1* | 6/2003 | Li ............ G06K 9/00228 382/227 |
| 2004/0260521 | A1 | 12/2004 | Aggarwal |
| 2013/0166621 | A1 | 6/2013 | Zhu |
| 2017/0076224 | A1 | 3/2017 | Munawar |

OTHER PUBLICATIONS

Sovierzoski, Miguel Antonio et al. "Evaluation of ANN Classifiers During Supervised Training with ROC Analysis and Cross Validation" 2008 [ONLINE] Downloaded Feb. 17, 2021 https://ieeexplore.IEEE.org/stamp/stamp.jsp?arnumber=4548676 (Year: 2008).*

Nithin, Kanishka and Bagavathi Sivakumar. "Generic Feature Learning in Comptuer Vision" 2015 [ONLINE] Downloaded Feb. 17, 2021 https://www.sciencedirect.com/science/article/pii/S1877050915021651 (Year: 2015).*

Nithin, D. Kanishka et al. "Generic feature learning in computer vision," Procedia Computer Science Jan. 2015, pp. 202-209, 58.

Krizhevsky, Alex et al. "Using very deep autoencoders for content-based image retrieval," ESANN, Apr. 2011, 7 pages.

Bengio, Yoshua et al. "Greedy layer-wise training of deep networks," Advances in neural information processing systems, 2007, 8 pages.

Office Action for U.S. Appl. No. 14/854,885 dated Nov. 27, 2018.

Jiménez-Valverde, "Insights Into the Area Under the Receiver Operating Characteristic Curve (Auc) As a Discrimination Measure in Species Distribution Modellinggeb", Global Ecology and Biogeography, (Global Ecol. Biogeogr.) (2012), Apr. 2012, pp. 498-507, vol. 21, Issue 4.

Lange, et al., "Deep Auto-Encoder Neural Networks in Reinforcement Learning", IEEE 2010, Jul. 2010, 8 pages.

Wikipedia, "Receiver Operating Characteristic", https://en.wikipedia.orgiwiki/Receiver_operating_characteristic, last downloaded Jun. 20, 2017, 6 pages.

Amaral, T. et al., "Using Different Cost Functions to Train Stacked Auto-encoders," 12th Mexican International Conference on Artificial Intelligence (MICAI), Nov. 2013. (pp. 1-7).

Licciardi, G.A. "Nonlinear PCA for Visible and Thermal Hyperspectral Images Quality Enhancement," IEEE Geoscience and Remote Sensing Letters, vol. 12, No. 6, Jun. 2015. (pp. 1228-1231).

Takamune, N. et al., "Maximum Reconstruction Probability Training of Restricted Boltzmann Machines With Auxiliary Function Approach," 2014 IEEE International Workshop on Machine Learning for Signal Processing, Sep. 2014. (pp. 1-6).

Office Action for U.S. Appl. No. 14/854,885 dated Jun. 11, 2018.

* cited by examiner

ADAPTIVE CONTROL OF NEGATIVE LEARNING FOR LIMITED RECONSTRUCTION CAPABILITY AUTO ENCODER

BACKGROUND

Technical Field

The present invention relates generally to information processing and, in particular, to adaptive control of negative learning for a limited reconstruction capability auto encoder.

Description of the Related Art

In accordance with one particular prior art approach (hereinafter "conventional technique") relating to auto encoding, the reconstruction capability of an auto encoder is limited when some negative data is provided. This conventional technique can be used for anomaly detection (e.g., outlier detection, novelty detection, and so forth).

In real applications, all of the negative data is not available at the beginning of training and is added over time as a result of human intervention, e.g., in the cases of false positive or false negative classification. A constant value for the negative learning throughout the training may not produce the optimal results.

However, a deficiency of the conventional technique is that every time new data is available, the user needs to tediously adjust the negative learning iterations by trial and error before getting an acceptable result. That is, the conventional technique requires manually adjusting a parameter that determines the number of iterations for the negative learning after each epoch of the positive learning. Adjusting this parameter is not straightforward, as it depends on many factors including, for example: the size of the negative data versus the size of the positive data; the dimensions of the data; and the problem complexity.

Hence, there is a need for adaptive control for negative learning for a limited reconstruction capability auto encoder.

SUMMARY

According to an aspect of the present invention, a computer-implemented method is provided for training a classification model. The method includes preparing, by a processor, positive class data and negative class data. The method further includes iteratively training the classification model, by the processor, using the positive class data and the negative class data such that the positive class data is reconstructed and the negative class data is prevented from being constructed, by the classification model. In response to a selection of a non-integer value as a number of negative learning iterations to be performed to train the classification model, a particular set of the negative class data that is reconstructed best by the classification model from among all of the negative class data is selected to be used for negative learning by the classification model. The training based on the positive class data is performed once before the negative learning iterations and once after each of the negative learning iterations.

According to another aspect of the present invention, a computer program product is provided for training a classification model. The computer program product includes a non-transitory computer readable storage medium having program instructions embodied therewith. The program instructions are executable by a computer to cause the computer to perform a method. The method includes preparing, by a processor, positive class data and negative class data. The method also includes iteratively training the classification model, by the processor, using the positive class data and the negative class data such that the positive class data is reconstructed and the negative class data is prevented from being constructed, by the classification model. In response to a selection of a non-integer value as a number of negative learning iterations to be performed to train the classification model, a particular set of the negative class data that is reconstructed best by the classification model from among all of the negative class data is selected to be used for negative learning by the classification model. The training based on the positive class data is performed once before the negative learning iterations and once after each of the negative learning iterations.

According to yet another aspect of the present invention, a computer system is provided for training a classification model. The computer system includes a processor. The processor is configured to prepare positive class data and negative class data. The processor is also configured to iteratively train the classification model using the positive class data and the negative class data such that the positive class data is reconstructed and the negative class data is prevented from being constructed, by the classification model. In response to a selection of a non-integer value as a number of negative learning iterations to be performed to train the classification model, a particular set of the negative class data that is reconstructed best by the classification model from among all of the negative class data is selected to be used for negative learning by the classification model. The training based on the positive class data is performed once before the negative learning iterations and once after each of the negative learning iterations.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
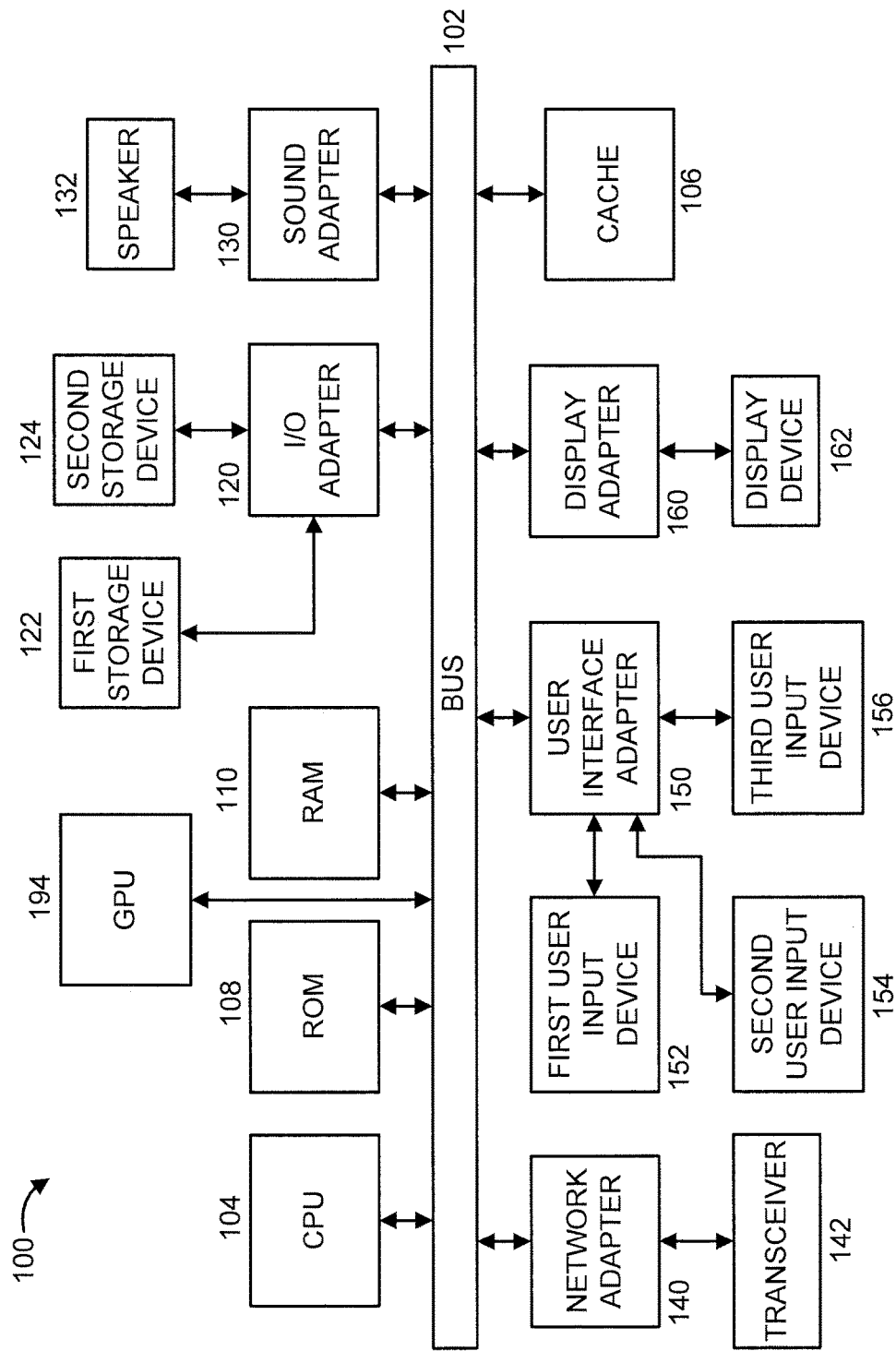
FIG. 1 shows an exemplary processing system to which the present invention may be applied, in accordance with an embodiment of the present invention.

The present invention is directed to adaptive control of negative learning for a limited reconstruction capability auto encoder. It is to be appreciated that for some applications, limiting the reconstruction capability of an auto encoder can improve its performance in these applications. As used herein, the terms "limiting the reconstruction capability" and "limited reconstruction capability" refer to the capability of the auto encoder to reconstruct a signal that was not part of the training data used for the auto encoder that is being limited in its reconstruction capability.

In an embodiment, the present invention provides on-the-fly automatic adjustment of the negative learning iterations parameter of a limited reconstruction auto encoder, which can enable the training of the aforementioned prior art (conventional) technique (or any limited reconstruction capability auto encoder) to adapt in accordance with the problem complexity and the available data. That is, the present invention allows control of what should be learned by an auto encoder and what should not be learned. In this way, a limited reconstruction capability auto encoder to which the present invention is applied can solve a wider range of problems that require online/active learning settings.

It is to be appreciated that in a one-class classification problem, most of the available data is the non-anomalous data (positive data). However, some anomaly data (negative data) might accumulate over time (may be even by human intervention).

The present invention uses any such data to improve the one-class classifier.

Positive learning uses all the available positive data to compute the error function and go along the gradient towards an optimal solution. Negative learning uses all the negative data but goes against the gradient. This leads the system to a solution where it can only reconstruct the non-anomalous data. In order to minimize the false classifications, a balance should be maintained between the negative and positive learning phases. The present invention is capable of achieving and maintaining this balance.

The proposed adaptive learning method of the present invention allows a limited reconstruction capability auto encoder to adjust the number of negative learning iterations parameter adaptively, thus saving the user from the sub-optimal and tedious process of defining the parameter by trial-and-error.

The present invention can be used for online/active learning to improve the classifier as more examples become available. The present invention makes no assumptions about the size of negative data or the problem complexity.

The adaptive part of the algorithm is fully parallelizable. Given hardware resources (e.g. GPU) the total time of the convergence will not be effected.

The technique is generic to different kind of models and training algorithms used for auto encoders including, by not limited to, for example: Stochastic Gradient Descent (SGD); Batch Gradient Descent; and Contrastive Divergence (CD).

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
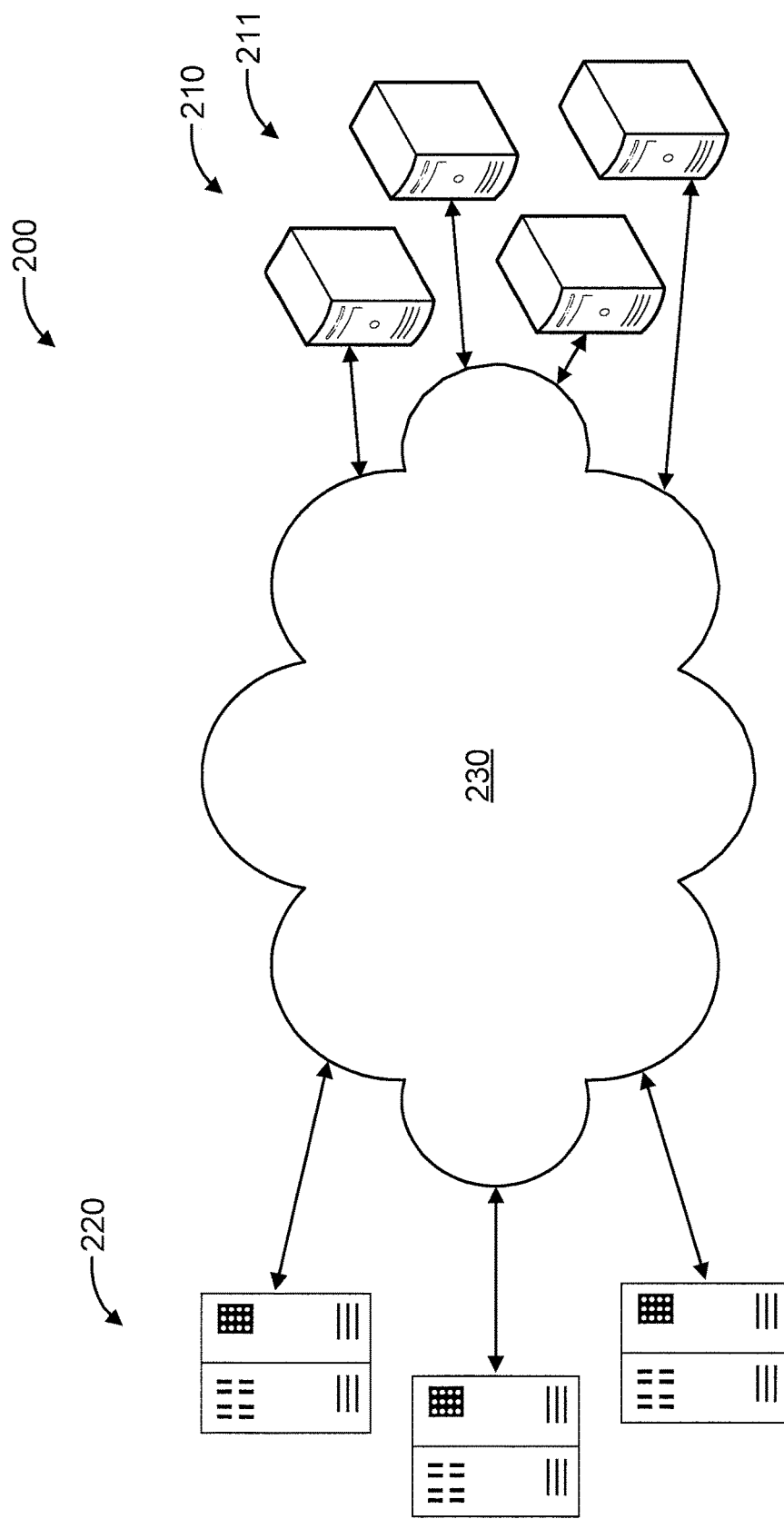
FIG. 2 shows an exemplary system to which the present invention can be applied, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
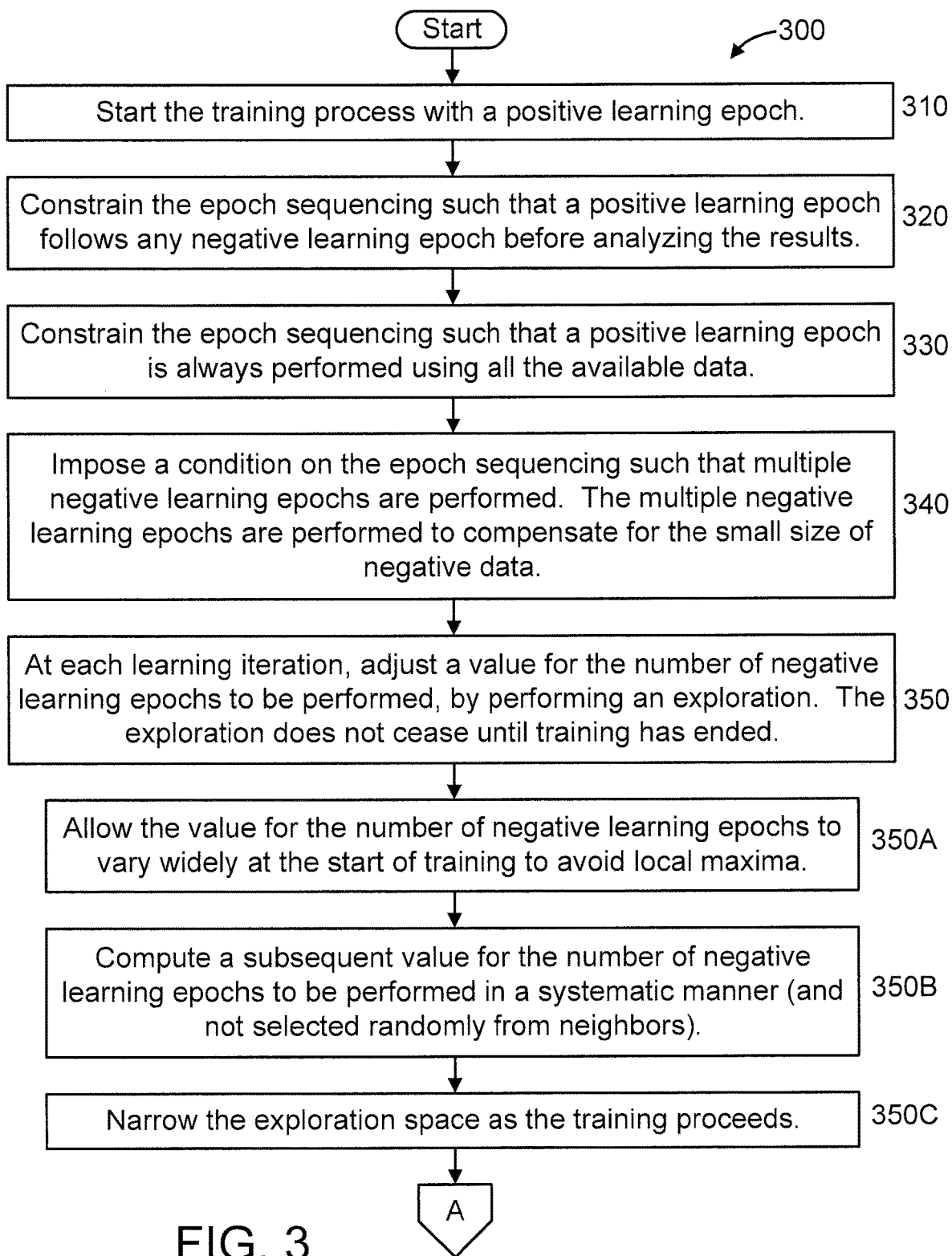
FIGS. 3-4 show an exemplary method for adaptive control of negative learning for a limited reconstruction capability auto encoder, in accordance with an embodiment of the present invention.
Figure 4:
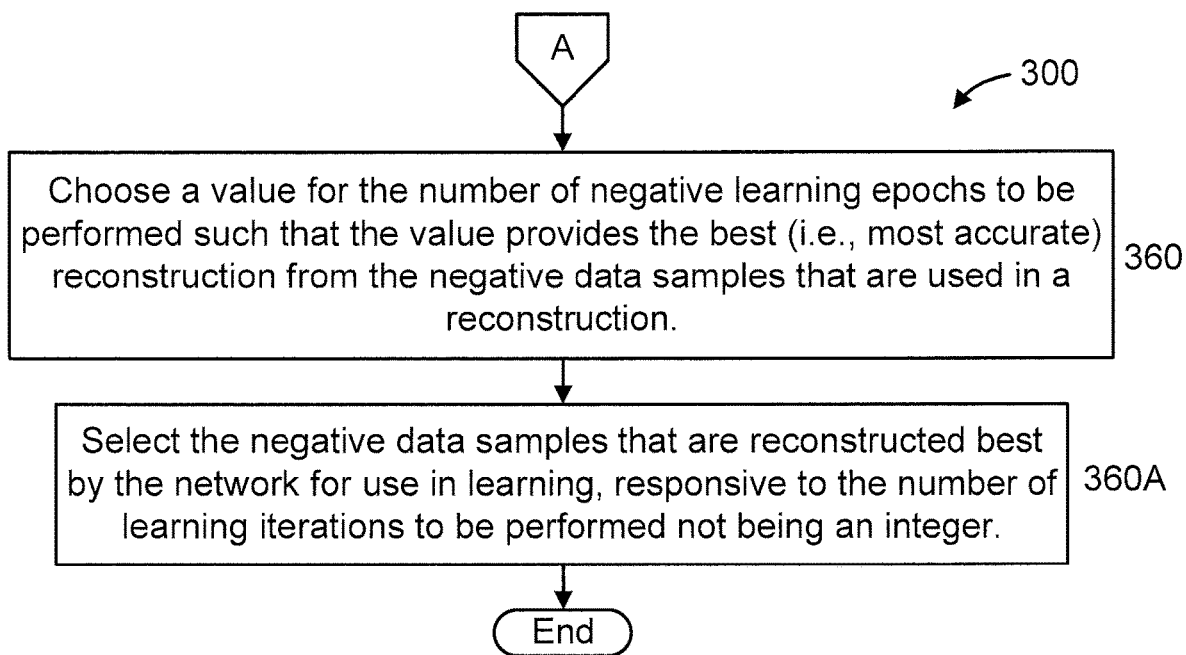
Figure 5:
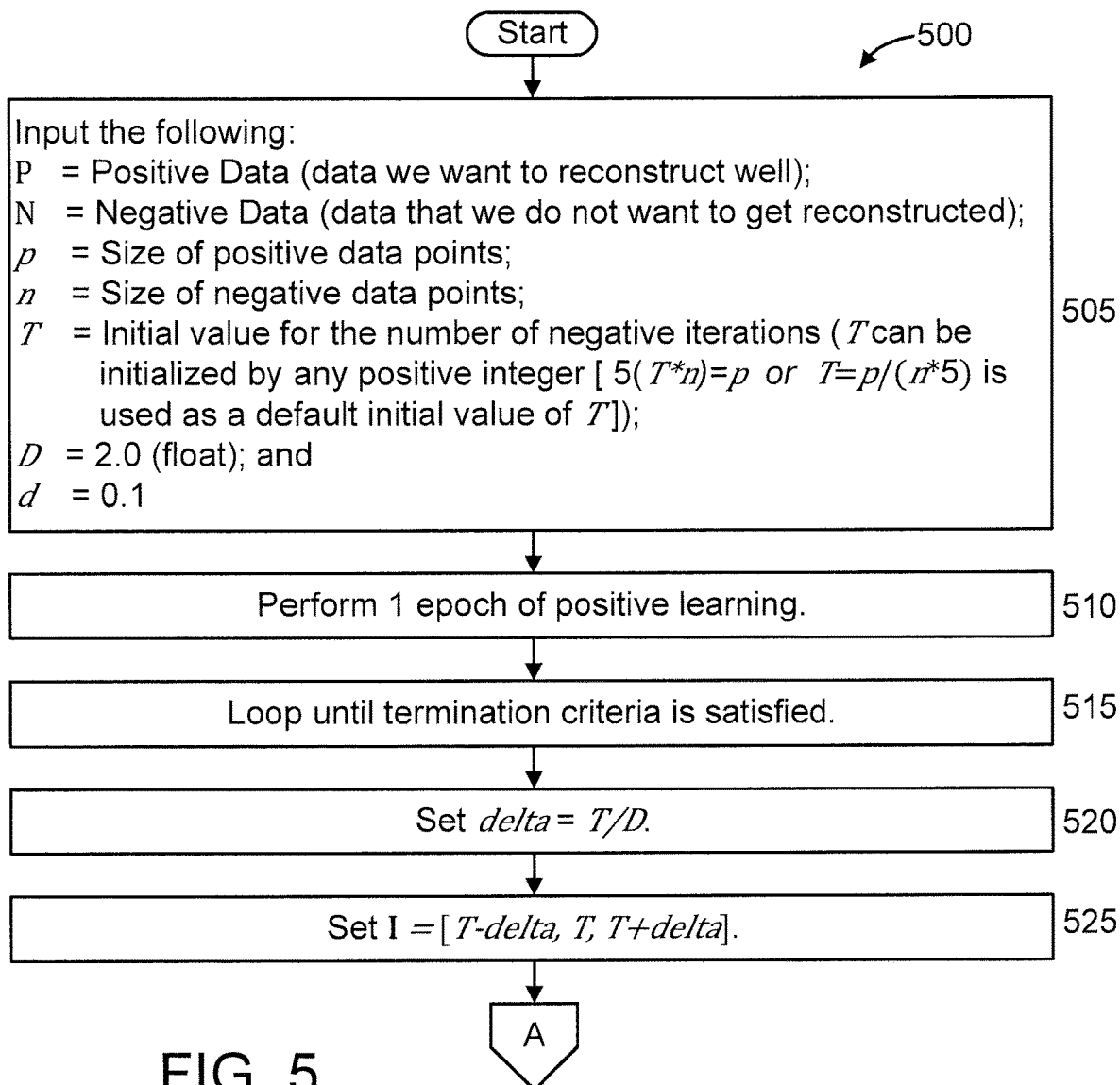
FIGS. 5-7 show another exemplary method for adaptive control of negative learning for a limited reconstruction capability auto encoder, in accordance with an embodiment of the present invention.
Figure 6:
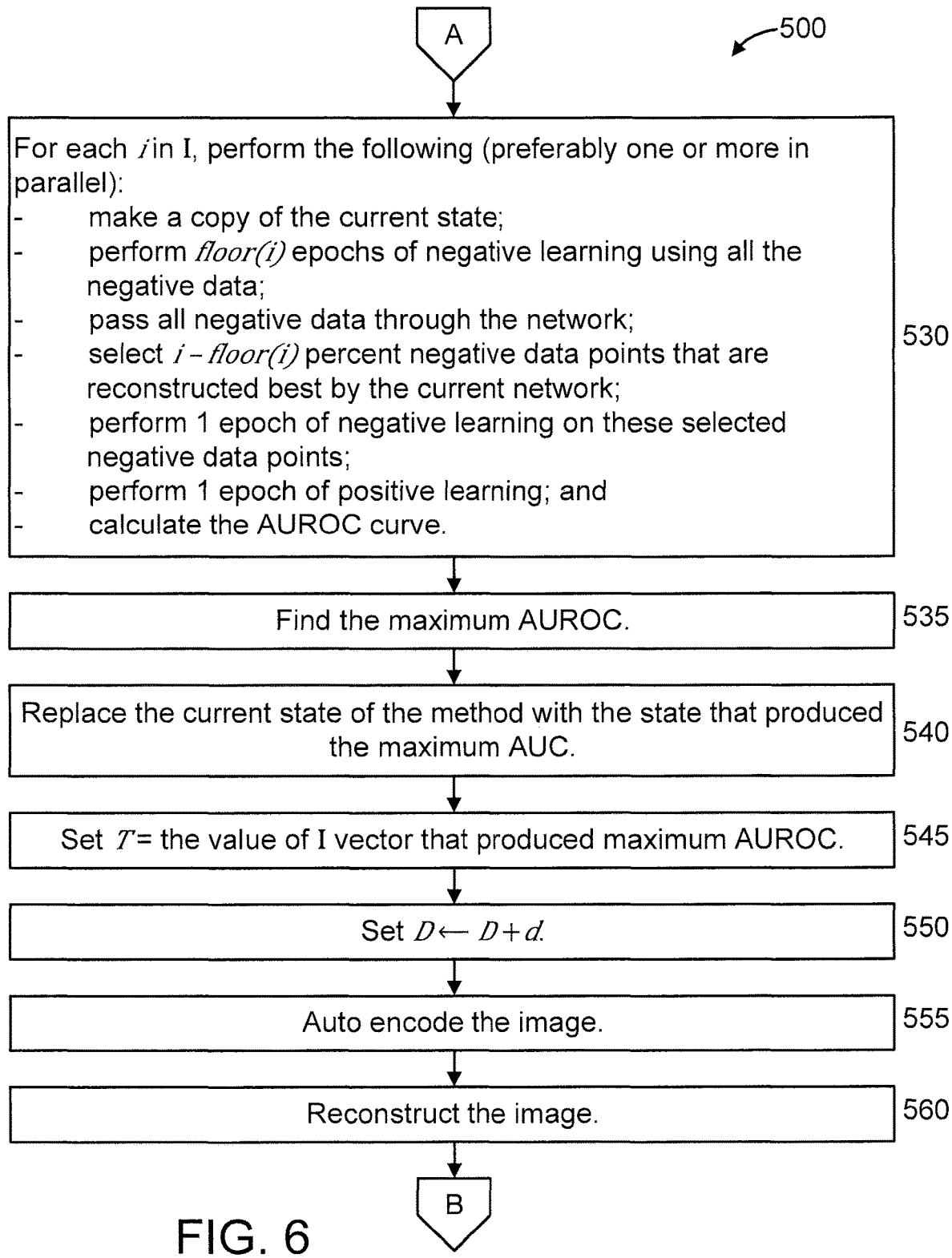
Figure 7:
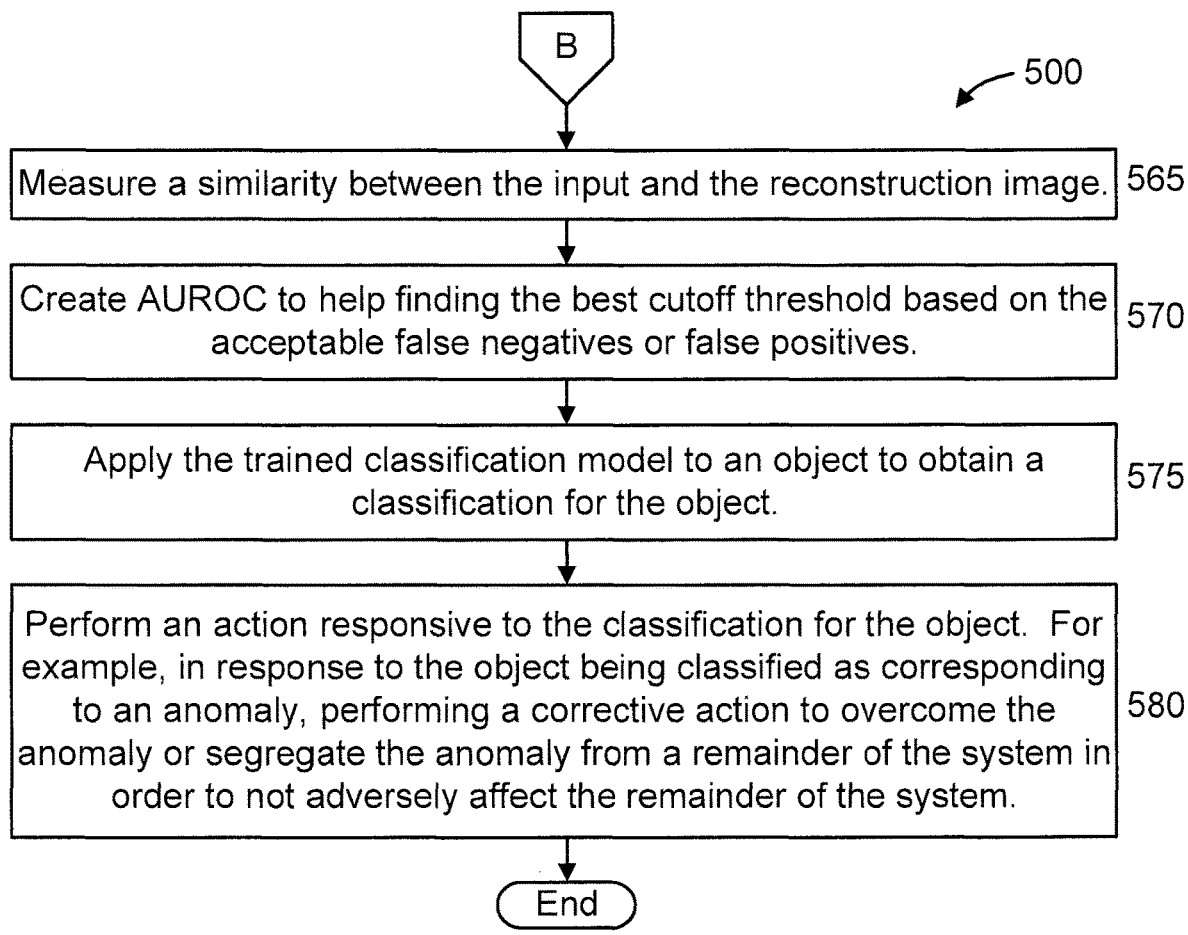

Further, it is to be appreciated that processing system 100 may perform at least part of the method described herein including, for example, at least part of method 300 of FIGS. 3-4 and/or at least part of method 500 of FIGS. 5-7. Similarly, part or all of system 200 may be used to perform at least part of method 300 of FIGS. 3-4 and/or at least part of method 500 of FIGS. 5-7.

FIG. 2 shows an exemplary system 200 to which the present invention can be applied, in accordance with an embodiment of the present invention. The system 200 includes a computer processing device 210 having an auto encoder 210A. The computer processing device 210 can interface with a set of servers 220 to provide auto encoded data to the servers, with such data auto encoded in accordance with the present invention.

Each of the computer processing device 210 and the servers in the set 200 include a transceiver 299 for sending and receiving data. Hence, auto encoded data from the auto encoder 210A is sent to one or more of the servers 220 using the transceivers 299 in these devices to send or receive the data.

In the embodiment shown in FIG. 2, the elements thereof are interconnected by a network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIGS. 3-4 show an exemplary method 300 for adaptive control of negative learning for a limited reconstruction capability auto encoder, in accordance with an embodiment of the present invention.

Referring to FIG. 3, at step 310, start the training process with a positive learning epoch.

At step 320, constrain the epoch sequencing such that a positive learning epoch follows any negative learning epoch before analyzing the results.

At step 330, constrain the epoch sequencing such that a positive learning epoch is always performed using all the available data.

At step 340, impose a condition on the epoch sequencing such that multiple negative learning epochs are performed. The multiple negative learning epochs are performed to compensate for the small size of negative data (usually in real world problems, there will be a very small size of outlier data points).

At step 350, at each learning iteration, adjust a value for the number of negative learning epochs to be performed, by performing an exploration. The exploration does not cease until training has ended.

In an embodiment, step 350 can include one or more of steps 350A-C.

At step 350A, allow the value for the number of negative learning epochs to vary widely at the start of training to avoid local maxima.

At step 350B, compute a subsequent value for the number of negative learning epochs to be performed in a systematic manner (and not selected randomly from neighbors).

At step 350C, narrow the exploration space as the training proceeds.

Referring to FIG. 4, at step 360, choose a value for the number of negative learning epochs to be performed such that the value provides the best (i.e., most accurate) reconstruction from the negative data samples that are used in a reconstruction.

It is to be appreciated that method 300 always behaves greedily and chooses a value that produces the best result (best, i.e., most accurate reconstruction).

In an embodiment, step 360 can include step 360A.

At step 360A, select the negative data samples that are reconstructed best by the network for use in learning, responsive to the number of learning iterations to be performed not being an integer. If the number of negative iterations is not an integer, then the last iteration chooses the ratio of best reconstructed samples by the network. For example, consider a case where the number of negative iterations is equal to 7.6. Thus, 7 full iterations have been performed and 60% negative examples are selected that are best reconstructed and another negative iteration is performed.

FIGS. 5-7 show another exemplary method 500 for adaptive control of negative learning for a limited reconstruction capability auto encoder, in accordance with an embodiment of the present invention. The method 400 described above can be considered an overview of the present invention, with method 500 further describing the methodology of the present invention, in accordance with an embodiment of the present invention.

The method 500 can be considered to include the following four stages: (1) data preparation stage; (2) training stage; and (3) testing/reconstruction stage; and (4) application stage. Step 505 corresponds to the data preparation stage. Steps 510-550 correspond to the training stage. Steps 555-570 correspond to the testing/reconstruction stage. Steps 575 to 580 correspond to the application stage. The method 500 is configured to adaptively balance the negative and positive training such that the Area Under Receiver Operating Characteristics (AUROC) curve value keeps on increasing monotonically. The Area Under Receiver Operating Characteristic is a common summary statistic for the goodness of a predictor in a binary classification task. It is equal to the probability that a predictor will rank a randomly chosen positive instance higher than a randomly chosen negative one.

Referring to FIG. 5, at step 505, input the following:
P←F Positive Data (data we want to reconstruct well);
N←F Negative Data (data that we do not want to get reconstructed);
p←F Size of positive data points;
n←F Size of negative data points;
T←F Initial value for the number of negative iterations (T can be initialized by any positive integer [5(T*n)=p or T=p/(n*5) is used as a default initial value of T]);
D←2.0 (float); and
d←0.1

At step 510, perform 1 epoch of positive learning.

At step 515, loop until termination criteria is satisfied. In an embodiment, the termination criteria can include, but is not limited to, for example, total number of epochs can be a terminating criteria, testing some convergence properties may be another criteria to stop. For example, if in the last few epochs the results are not improving we can stop. The preceding termination criteria are merely illustrative and, thus, other termination criteria can also be used in accordance with the teachings of the present invention, while maintaining the spirit of the present invention.

At step 520, set delta=T/D.

At step 525, set I=[T−delta, T, T+delta].

Referring to FIG. 6, at step 530, for each i in I, perform the following (preferably one or more in parallel):
make a copy of the current state;
perform floor(i) epochs of negative learning using all the negative data;
pass all negative data through the network;

select i—floor(i) percent negative data points that are reconstructed best by the current network;
perform 1 epoch of negative learning on these selected negative data points;
perform 1 epoch of positive learning; and
calculate the Area Under Receiver Operating Characteristic (AUROC) curve.

At step 535, find the maximum AUROC.

At step 540, replace the current state of the method with the state that produced the maximum AUC.

At step 545, set T=the value of I vector that produced maximum AUROC.

At step 550, set D←F D+d.

At step 555, auto encode the image.

At step 560, reconstruct the image.

Referring to FIG. 7, at step 565, measure a similarity between the input and the reconstruction image. In an embodiment, the similarity is measured using mean square error. Of course, other techniques can also be used to measure the similarity, while maintaining the spirit of the present invention.

At step 570, create AUROC to help finding the best cutoff threshold based on the acceptable false negatives or false positives.

At step 575, apply the trained classification model to an object to obtain a classification for the object.

At step 580, perform an action responsive to the classification for the object. For example, in response to the object being classified as corresponding to an anomaly, performing a corrective action to overcome the anomaly or segregate the anomaly from a remainder of the system in order to not adversely affect the remainder of the system.

Hence, as described above, a constant value of the number of negative iterations throughout the training does not produce the optimal results or, at the least, slows down the convergence of the system.

The adaptive approach of the present invention should always be used instead of trying to find a good value by trial and error as per the prior art.

After training the system, the system can be used for anomaly detection, and so forth.

It is to be appreciated that similar results may be achieved by adapting the learning rate of the positive and negative training stages instead of modifying the number of negative epochs.

Figure 8:
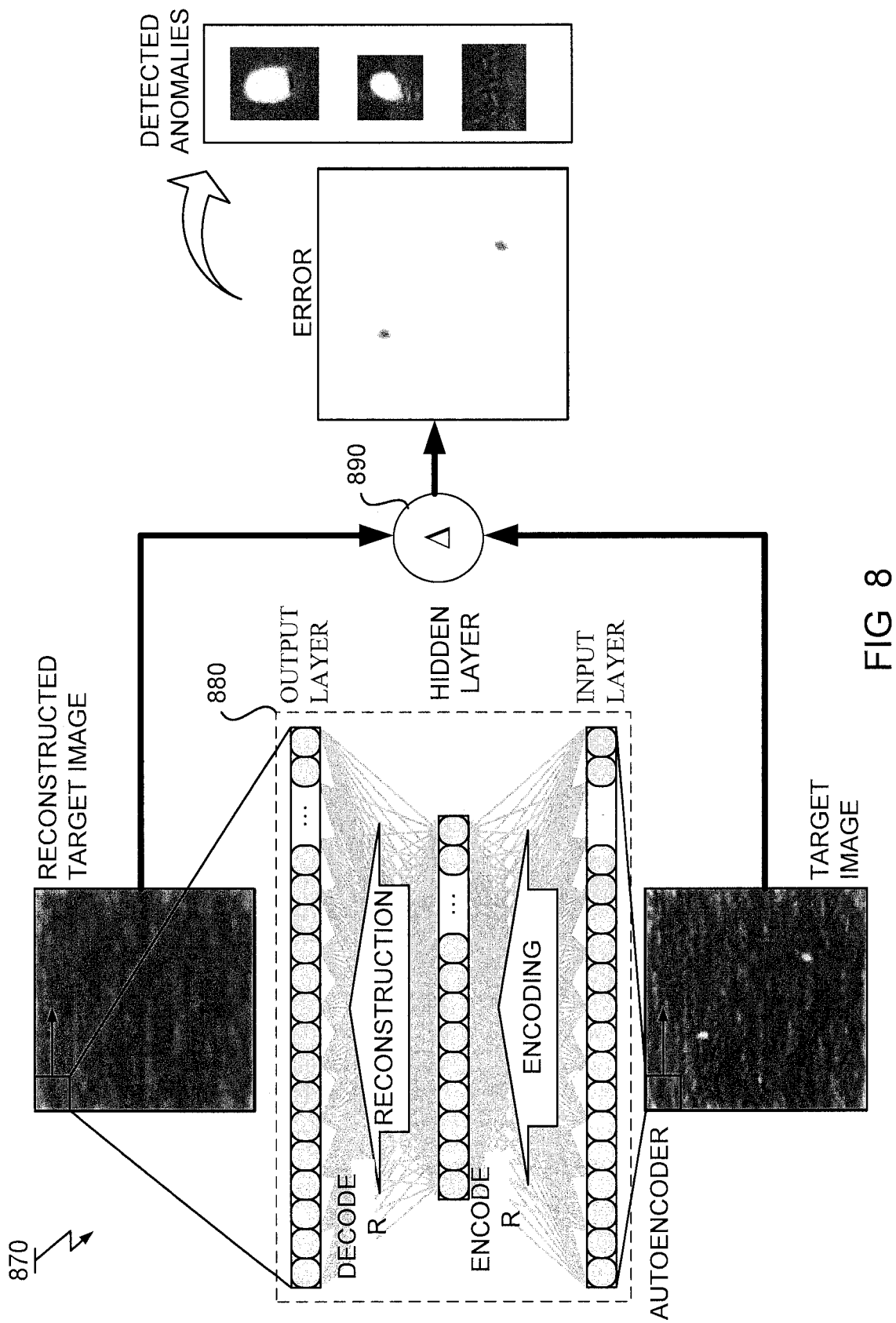
FIG. 8 shows an exemplary anomaly detection system using an auto encoder, in which limiting reconstruction capability of the auto encoder is preferred, in accordance with an embodiment of the present invention.

FIG. 8 shows an anomaly detection system 870 using an auto encoder 880, in which limiting the reconstruction capability of the auto encoder 880 is preferred, in accordance with an embodiment of the present invention.

The anomaly detection system 70 includes an auto encoder 80 and an image subtraction unit 890. The auto encoder 880 may include an input layer, a hidden layer and an output layer. Patch images, segmented from a target image, are fed into the input layer of the auto encoder 880. The auto encoder 880 performs reconstruction of the input images and resulted images are outputted from the output layer. The output images are then merged into a reconstructed target image. The image subtraction unit 890 subtracts the reconstructed target image from the target image to calculate an error map between the images. After obtaining the error map, a region presenting relatively large error can be detected as an anomalous region where a non-positive object, i.e., an anomaly, may be contained.

In this application, the auto encoder is trained such that the auto encoder can only reconstruct positive data (e.g. sea) as well as possible and suppress reconstruction of any non-positive data (e.g. anomaly such as noise, garbage, etc.).

If the auto encoder 80 can encode any input image and reconstruct it as a positive data, it can be easily found out what is anomalous. Anything that is not reconstructed can be considered as an anomaly.

Although merely positive data, that should be reconstructed, is used for training the auto encoder and non-positive data may be carefully removed from training data, the trained auto encoder can acquire an ability to reconstruct unseen signals similar to the non-positive data. Thus, non-positive objects contained in the target image may also be reconstructed.

In one or more embodiments according to the present invention, a novel learning process is conducted in which not only positive class data to be learned, but also negative class data to not be learned, are utilized for training the classification model. Additionally, a negative training based on the negative class data as well as a positive training based on the positive class data are performed. The classification model may be a reconstruction model or include at least part of the reconstruction model. The reconstruction model may be an auto encoder. During the positive training, the classification model is trained to adjust one or more parameters of the classification model so that the positive class data can be reconstructed by the classification model. In contrast to positive training, during the novel negative training, the classification model is trained based on the negative class data to adjust one or more parameters of the classification model so that the negative class data is prevented from being reconstructed by the classification model.

In other aspects, the negative training is performed so as to adjust the one or more parameters in an opposite manner to the positive training in regard to gradient of an objective function used in an unsupervised learning algorithm. In terms of neural networks, in contrast to the positive training, the negative training is performed such that connections used to reconstruct the negative class data become weak.

Figure 9:
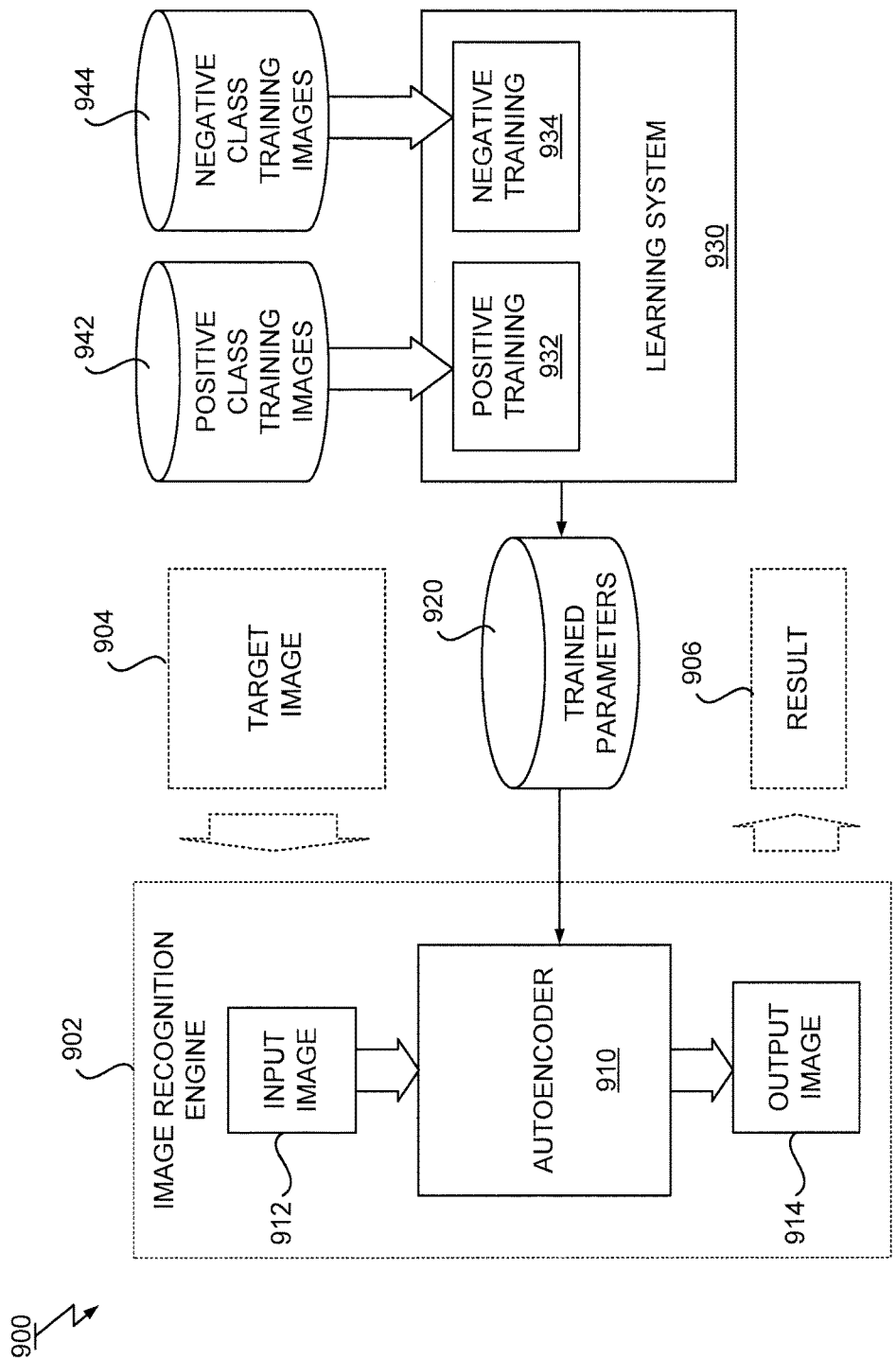
FIG. 9 shows an exemplary computer system incorporating an auto encoder and a learning system for the auto encoder, in accordance with an embodiment of the present invention.

FIG. 9 shows an exemplary computer system incorporating an auto encoder and a learning system for the auto encoder, in accordance with an embodiment of the present invention.

The computer system 900 includes an auto encoder 910 that receives an input image 912 and outputs an output image 914 reconstructed from the input image 912 using trained parameters 920; and a learning system 930 that performs machine learning of the auto encoder 910 based on a set of training images 942, 944 to obtain the trained parameters 920.

In the present embodiment, the auto encoder 910 may include an input layer, a hidden layer and an output layer. The auto encoder 910 receives a patch image as the input image 912 by the input layer and outputs a reconstructed patch image as the output image 914 from the output layer. Each pixel may hold, but is not limited to, a binary value, a grayscale value or a color value. The image may be provided as, but is not limited to, an image file, a part of the image file, a frame or part of the frame of video file or video stream.

As shown in FIG. 9, there may be described an image recognition engine 902 incorporating the auto encoder 910. The image recognition engine 902 may perform tasks including, at least, detecting anomalous objects, reducing noise, classifying images or pixels into classes (e.g., /sky/, /car/, /cat/, etc.) or the like. The image recognition engine 902 may receive a target image 904, perform the above-mentioned task and output a result 906 that may include anomalous objects, de-noised images, predicted classes or class probabilities, etc. depending on the task.

The learning system 930 performs the process for the auto encoder 910 to learn according to an exemplary embodiment of the present invention. The learning system 930 performs the learning process using the given training images 942, 944 to optimize parameters of the auto encoder 910.

In one embodiment, the training images are divided into two classes of the training images, including positive class training images 942 and negative class training images 944. The training images 942, 944 include a plurality of images, each of which may be assigned a label indicating whether each image is positive or negative. The positive class training image is defined as data which is preferred to be reconstructed well, whereas the negative class training image is defined as data which is not preferred to be reconstructed. The label may be assigned by typically human experts. However, it does not preclude that the positive class training images 942 include some of the data that is not preferred to be reconstructed.

In the describing embodiment, the learning system 930 includes a positive training module 932 for training the auto encoder 910 using the positive class training images 942, and a negative training module 934 for training the auto encoder 910 using the negative class training images 944.

The positive training module 932 trains the auto encoder 910 to adjust the parameters 920 of the auto encoder 910 such that every input images can be reconstructed as well as possible. The positive training may enable the auto encoder 910 to reconstruct a huge number of the input images. In terms of neural networks, the connections that are used to reconstruct the positive class images become strong by the positive training. When some image similar to any one of the positive class training images 142 is inputted to the auto encoder 910, the trained auto encoder 910 can output a reasonably well reconstructed image of the input image.

The negative training module 934 trains the auto encoder 910 to adjust the parameters 920 of the auto encoder 910 such that input images is not reconstructed well. In terms of the neural networks, the connections that are used to reconstruct the negative class image become weak by the negative training. The negative training is similar to forgetting. The auto encoder 910 is first trained so as to reconstruct the positive class images 942 by the positive training, but then the auto encoder 910 forgets the part of the learned system during the negative training. When some image similar to any one of the negative class training images 944 is inputted to the auto encoder 910, the trained auto encoder 910 does not output a reconstructed image back.

The learning system 930 may perform the positive training by the positive training module 932 and the negative training by the negative training module 934 alternately until a predetermined termination criterion is satisfied. In one embodiment, the positive training may be performed at the end of the learning. The termination criterion may be a convergence criterion based on a metric measuring convergence of the optimization, such as, e.g., reconstruction error or a stopping criterion such as the number of epochs.

In one embodiment, each of modules described in FIG. 9 may be implemented on a computer system, where program codes according to the embodiment of the present invention are loaded on a memory and executed by a processor.

As shown in FIG. 9, the computer system 900 includes one or more modules to provide various features and functions. These modules may be implemented in hardware, software or firmware executable on hardware, or a combination thereof. Also, these modules are presented only by way of example and are not intended to suggest any limitation. Alternative embodiments may include additional or fewer modules than those illustrated in FIG. 9, or the modules may be organized differently. Furthermore, it should be recognized that, in some embodiments, the functionality of some modules may be broken into multiple modules or, conversely, the functionality of several modules may be combined into a single or fewer modules.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for training a classification model, comprising:
  iteratively training the classification model, by a processor, using positive class data and negative class data such that the positive class data is reconstructed and the negative class data is prevented from being constructed, by the classification model; and
  selecting a non-integer value as a number of negative learning iterations to be performed to train the classification model; and
  selecting a percentage of a particular set of the negative class data that is reconstructed best with respect to a highest reconstruction accuracy by the classification model from among all of the negative class data to be equal to a fractional part of the non-integer data, in response to a selection of the non-integer value as the number of negative learning iterations to be performed to train the classification model,
  wherein the training based on the positive class data is performed once before the negative learning iterations and once after each of the negative learning iterations.

2. The computer-implemented method of claim 1, further comprising selecting, by the processor, as the number of negative learning iterations, a value from among a plurality of candidate values that results in a best negative class data reconstruction result having the highest reconstruction accuracy in order to determine next candidates for the number of negative learning iterations.

3. The computer-implemented method of claim 2, wherein the value is selected from among the plurality of candidate values based on providing a maximum value of Area Under Receiver Operating Characteristic (AUROC) compared to other ones of a plurality of candidate values.

4. The computer-implemented method of claim 1, wherein said training step is performed uses a supervised learning method.

5. The computer-implemented method of claim 1, wherein the supervised learning method is selected from the group consisting of a contrastive divergence method, a stochastic gradient descent method, and a batch gradient descent method.

6. The computer-implemented method of claim 1, wherein the training based on the positive class data and the negative class data are alternatively performed until a predetermined criterion is satisfied.

7. The computer-implemented method of claim 1, wherein the classification model is comprised in an auto encoder.

8. The computer-implemented method of claim 1, wherein the classification model is trained to encode an input signal that is similar to the negative class data to provide an encoded input signal, and to decode the encoded input signal to a closest representation in the classification model to the positive class data.

9. The computer-implemented method of claim 1, further comprising applying, by the processor, the classification model, trained by the positive class data and the negative class data, to an object to classify the object.

* * * * *